United States Patent
Hwang

(10) Patent No.: US 7,606,775 B2
(45) Date of Patent: Oct. 20, 2009

(54) MOBILE COMMUNICATION TERMINAL USING MOBP LEARNING

(75) Inventor: Ki-Chang Hwang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 605 days.

(21) Appl. No.: 10/868,816

(22) Filed: Jun. 17, 2004

(65) Prior Publication Data

US 2004/0259515 A1    Dec. 23, 2004

(30) Foreign Application Priority Data

Jun. 20, 2003  (KR) ...................... 10-2003-0040360

(51) Int. Cl.
*G06E 1/00*  (2006.01)
*G06E 3/00*  (2006.01)

(52) U.S. Cl. .................... 706/15; 455/557; 455/434; 704/231; 370/335; 370/350

(58) Field of Classification Search .................. 706/15, 706/30, 34; 704/232; 370/493, 276, 352
See application file for complete search history.

(56) References Cited

U.S. PATENT DOCUMENTS

| 4,937,872 | A | * | 6/1990 | Hopfield et al. ............. 704/232 |
| 5,442,730 | A | | 8/1995 | Bigus ........................... 395/22 |
| 5,526,357 | A | * | 6/1996 | Jandrell ....................... 370/346 |
| 6,230,084 | B1 | * | 5/2001 | Kijima et al. .................... 701/1 |
| 2003/0115164 | A1 | * | 6/2003 | Jeng et al. ....................... 706/15 |

FOREIGN PATENT DOCUMENTS

| JP | 02-222062 | | 9/1990 |
| JP | 403201159 A | * | 9/1991 |
| JP | 03-168861 | | 7/1992 |
| KR | 1998-058937 | | 10/1998 |
| KR | 2001-0095960 | | 11/2001 |
| KR | 2002-0014207 | | 2/2002 |

* cited by examiner

*Primary Examiner*—David R Vincent
*Assistant Examiner*—Kalpana Bharadwaj
(74) *Attorney, Agent, or Firm*—Ked & Associates, LLP

(57) ABSTRACT

A scheduling apparatus and method of an intelligent mobile communication terminal are provided. The scheduling apparatus of the mobile communication terminal may include a Real Time Clock (RTC) for providing a real time when an action of a mobile terminal is proceeding; a memory for storing information of a user mode and a CPU for standardizing a time value, a user mode information and an action of the terminal transferred from the RTC to store in the memory. The CPU may further transfer the standardized data stored in the memory to a co-processor through an interrupt and the CPU may control peripheral devices upon receiving an output value from the co-processor. The co-processor may also be provided for receiving data from the CPU through an interrupt communication and calculating an output value according to an MOBP learning algorithm. An LCD may output a message according to the output value under the control of the CPU.

28 Claims, 4 Drawing Sheets

US 7,606,775 B2

MOBILE COMMUNICATION TERMINAL USING MOBP LEARNING

The present application claims priority from Korean Patent Application No. 40360/2003, filed Jun. 20, 2003, the subject matter of which is incorporated herein by reference.

BACKGROUND OF THE INVENTION

1. Field of the Invention

Embodiments of the present invention may relate to a mobile communication terminal. More particularly, embodiments of the present invention may relate to a scheduling apparatus and method of an intelligent mobile communication terminal that is capable of learning a user's habit of using a mobile terminal so as to predict and execute a future function that the terminal user would use.

2. Background of Related Art

Mobile communication terminals have various supplementary functions in addition to general telephone functions. Such functions, however, may be limited to passive functions such as storing a phone number in a phone book in response to a key input of a user or displaying a message and alarming at a user's previously inputted date or time for management of some schedules.

Some functions are frequently used and other functions are not used. Additionally, sometimes only the frequently used functions are available for a specific time zone. That is, users may commonly use a specific function for a specific time zone unconsciously. Thus, the functions and time used by users may be different depending on users' habit of using the mobile terminals.

Users may perform the same function habitually or perform a key manipulation for a phone call. Frequently used phone numbers can be simply performed by using an abbreviated button. However, functions such as a short message service (SMS), e-mail, the Internet, games and reproduction of multimedia such as MP3 may be executed by several key manipulations, thereby causing a problem that the user must repeatedly perform the same procedure each time.

SUMMARY OF THE INVENTION

Embodiments of the present invention may provide a scheduling apparatus and method of an intelligent mobile communication terminal that is capable of automatically performing functions of a mobile terminal frequently used by a user over time. This may be accomplished by adapting to the user's terminal use habit through recognizing and learning the user's terminal use habits.

A scheduling apparatus of an intelligent mobile communication terminal may be provided that includes a Real Time Clock (RTC), a CPU, a co-processor and an LCD. The RTC may provide a real time when an action of a mobile terminal is proceeding. The memory may store information of a user mode. The CPU may standardize a time value, a user mode information and an action of the terminal transferred from the RTC to store the information in the memory. The CPU may transfer the standardized data stored in the memory to the co-processor through an interrupt. The CPU may further control general peripheral devices upon receiving an output value from the co-processor. The co-processor may receive data from the CPU through an interrupt communication and calculate an output value according to an MOBP learning algorithm. The LCD may output a message (or display) according to the output value under the control of the CPU.

A scheduling method of an intelligent mobile communication terminal may be provided that includes when user's manipulation of a terminal is sensed, the terminal may determine whether there is learned data related to an operation of the terminal for the current time. If there is learned data, a message may be output asking whether a frequently used function is to be used for the current time according to the learned content. The corresponding function may be automatically performed according to a user's response to the message or it may be switched to a terminal use habit learned state. If there is no learned data related to the operation of the terminal for the corresponding time in manipulating the terminal, the current operation process of the terminal may be learned (or stored) in order to schedule the terminal according to the learned data thereafter.

Additional advantages, objects, features and embodiments of the invention may be set forth in part in the description that follows and in part may become apparent to those having ordinary skill in the art upon examination of the following or may be learned from practice of the invention.

BRIEF DESCRIPTION OF THE DRAWINGS

The following represents brief descriptions of the drawings in which like reference numerals refer to like elements and wherein.

DETAILED DESCRIPTION OF PREFERRED EMBODIMENTS

Figure 1:
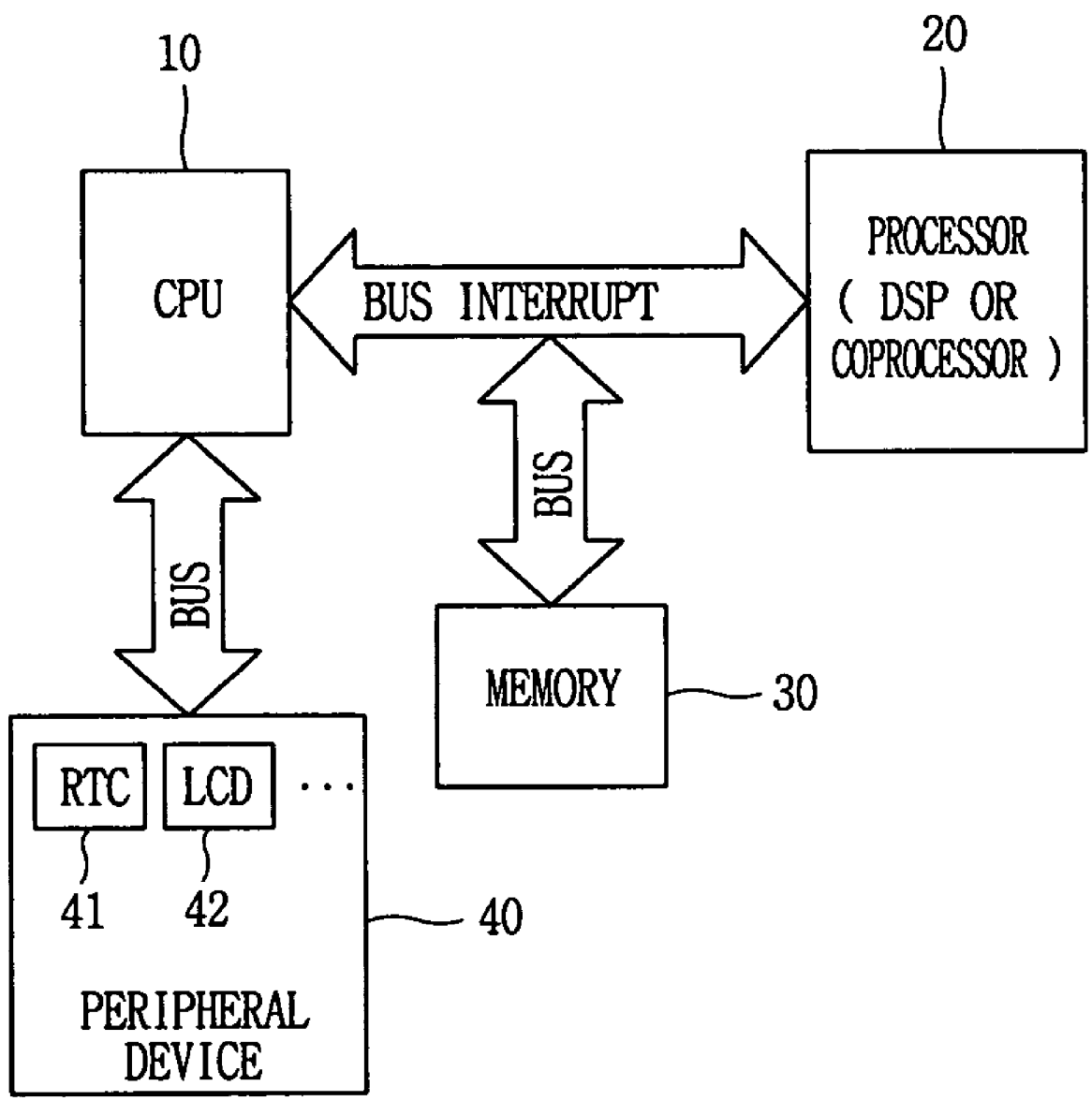
FIG. 1 illustrates an intelligent mobile communication terminal in accordance with an example embodiment of the present invention.

FIG. 1 illustrates an intelligent mobile communication terminal in accordance with an example embodiment of the present invention. Other embodiments and configurations are also within the scope of the present invention. More specifically, an intelligent mobile communication terminal may include a Real Time Clock (RTC) 41, a memory 30, a CPU 10 (or main processor), a co-processor 20, and a peripheral device 42. The RTC 41 may provide real time action proceedings of a mobile terminal. The memory 30 may store information of a user mode. The co-processor 20 may calculate standardized data according to a momentum back-propagation (MOBP) learning algorithm. Standardizing relates to converting values to use a normal distribution as will be described below. The CPU 10 may standardize a time value transferred from the RTC 41, the user mode information and action of the terminal to store them in the memory 30. The CPU 10 may also transfer standardized data stored in the memory 30 to the co-processor 20 through an interrupt and the CPU 10 may control general peripheral devices upon receiving an output value from the co-processor 20. The peripheral device 40 may include the RTC 41 and an LCD 42 to output (or display) a message according to the output value.

The memory 30 may provide user mode information to the CPU 10 and store input/output values calculated by the CPU 10. The memory 30 may also store connection strength and an output value calculated by the co-processor 20. The memory 30 may also provide its stored data to the CPU 10 and the co-processor 20 when the CPU 10 and the co-processor 20 make an interrupt communication with each other.

The CPU 10 and the co-processor 20 may make an interrupt communication, and when the CPU 10 standardizes the time value, the user mode information and an action of the terminal, the CPU 10 may store the information in the memory 30 and provide an interrupt to the co-processor 20. The co-processor 20 may receive the standardized data stored the memory 30, calculate an output value according to the MOBP learning algorithm and store the calculated output value in the memory 30. After the co-processor 20 stores the output value in the memory 30, the co-processor 20 may provide an interrupt to the CPU 10. Then, the CPU 10 may output a message to the LCD 42 according to the output value.

The co-processor 20 may be a Digital Signal Processor (DSP) or other type of processor in order to calculate the connection strength and the output value according to the MOBP learning algorithm.

The mobile communication terminal may use an intelligent algorithm in order to learn a user's usage habit and check which function the user may use in advance in order to automatically perform the terminal function. The MOBP learning algorithm, which is an improvement over a back-propagation (BP) learning algorithm, can be quickly applied to multi-variable nonlinear matters.

The back-propagation (BP) learning algorithm may have a multi-layer perceptron structure, and the learning method may be a supervised learning. For learning, input data and target output data may be required.

In the learning, the input value and the target output value are provided as a plurality of inputs/outputs and each output value may be calculated for input values. By the learning algorithm, the connection strength may be adjusted in a direction of reducing a difference between the target output value and the output value.

When the adjusting is finished, learning may be repeatedly performed in the same manner to obtain an optimum connection strength (Wk).

In obtaining the output value, when one input value is given to an input layer, the input value may be calculated with the connection strength between the input layer and a concealment layer and the connection strength between the concealment layer and an output layer. An output value may then be output to the output layer. This may be a forward neuron processing procedure that proceeds from the input layer to the output layer.

Obtaining the connection strength coefficient may be a backward neuron processing procedure that proceeds from the output layer to the input layer so that a difference between the target output value and the output value generated during the forward neuron processing procedure may be minimized.

The BP learning algorithm may have shortcomings that it can be converged into a local minimum value, have a large amount of calculation, and take a good deal of time for convergence. Thus, in embodiments of the present invention, the momentum method may be employed. While the back-propagation learning algorithm may obtain the connection strength according to a level of contribution of the difference by the output layer, the momentum back-propagation learning algorithm may also determine the amount of correction of the connection strength in consideration of the amount of correction of the previous connection strength coefficient (Wk).

The momentum method may be expressed by the following Equation (1):

$$\Delta \omega new = -\eta \frac{\partial E}{\partial \omega previous} + \alpha \Delta \omega previous \qquad \text{Equation (1)}$$

In Equation (1), the amount of correction ($\Delta \omega$new) of the new connection strength may increase a convergence speed by adding a value obtained by multiplying a momentum item to the changed amount ($\Delta \omega$previous) of the latest connection strength, to the changed amount of a current connection strength coefficient. In Equation (1), $\eta$ indicates a learning constant, $\alpha$ indicates a momentum item, and E indicates a difference.

The momentum item $\alpha$ may be approximately 0.9, and the value $\alpha$ may be adjusted to reduce a difference vibration to quicken the convergence speed.

Figure 2:
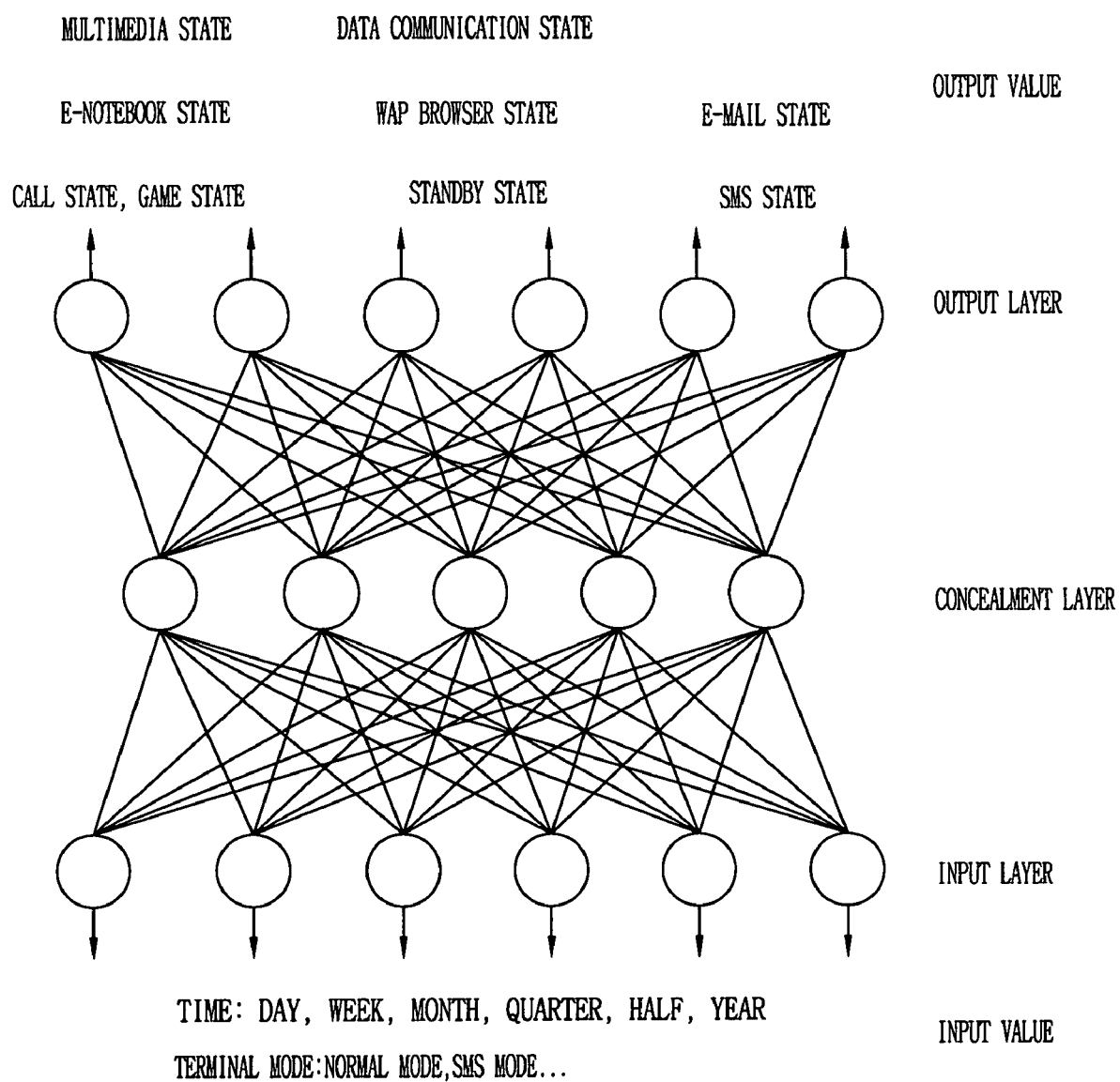
FIG. 2 illustrates input values and output values of an MOBP learning algorithm in accordance with an example embodiment of the present invention.

FIG. 2 illustrates input values and output values of an MOBP learning algorithm in accordance with an example embodiment of the present invention. Other values and embodiments are also within the scope of the present invention.

In order to use the MOBP learning algorithm, the input values of the input layer and the output values of the output layer may be standardized as follows. Input values coming into the input layer may be 1, a point when the terminal is used and/or 2 may indicate a state of the user mode.

'1', the time at which the terminal is used may be converted by a unit of a minute or an hour so as to be standardized to a value of −1 to 1, and references may be divided into a day (1440 minutes/24 hours), one week, one month, a quarter, a half, and a year (525600 minutes). For example, if an action of the terminal is defined by a unit of a minute and a time is standardized on the basis of a day, then since one day is 1440 minutes, values from 0 to 1440 minutes may be standardized to a value of −1 to 1. That is, since midnight (0 o'clock) is 0, then it may be standardized to a value of −1. Additionally, since noon (12 o'clock) is 720 minutes, then it may be standardized to '0'.

The input value '2' indicative of a state of the user mode may be standardized to a value between −1 and 1. This may define a mode according to users, a type of a Subscriber Identity Module (SIM) or according to a profile set by the user. In other words, every user may have frequently used functions of the mobile terminal. A call mode may be defined if a user frequently uses a phone according to a profile. An SMS mode may be defined if a user frequently uses a text message. A WAP browser mode may be defined if a user frequently uses the Internet. A normal mode may be defined for general cases. Each user mode may define an order and the standardization may be made according to the order.

An output value of the output layer for the input value may become an action of the mobile terminal at the time. The action of the terminal may include a call state, an Short Message Service (SMS) state, an E-mail state, a WAP browser state, a data or fax call state, a multimedia state, an organizer state, a game state, an idle state, or the like, according to functions of the terminal. Each state may include N number of supplementary information according to each function. Each supplementary information may include an index number. The terminal may have a storage space for storing the supplementary information according to the index number.

In the call state, there may be at least ten persons to which the user may frequently make a phone call. Likewise, in the game state, there may be 10 types of games so that the supplementary information of each operational state may store detailed subjects of each operation. For example, if the eight operation states (except for the idle state) include 10 supplementary information, respectively, the operations of the terminal may have a total of 81 states inclusive of the idle state, and like the input values, the output values may be standardized to a value of −1 to 1 according to an order of the index number added to each state.

Figure 3:
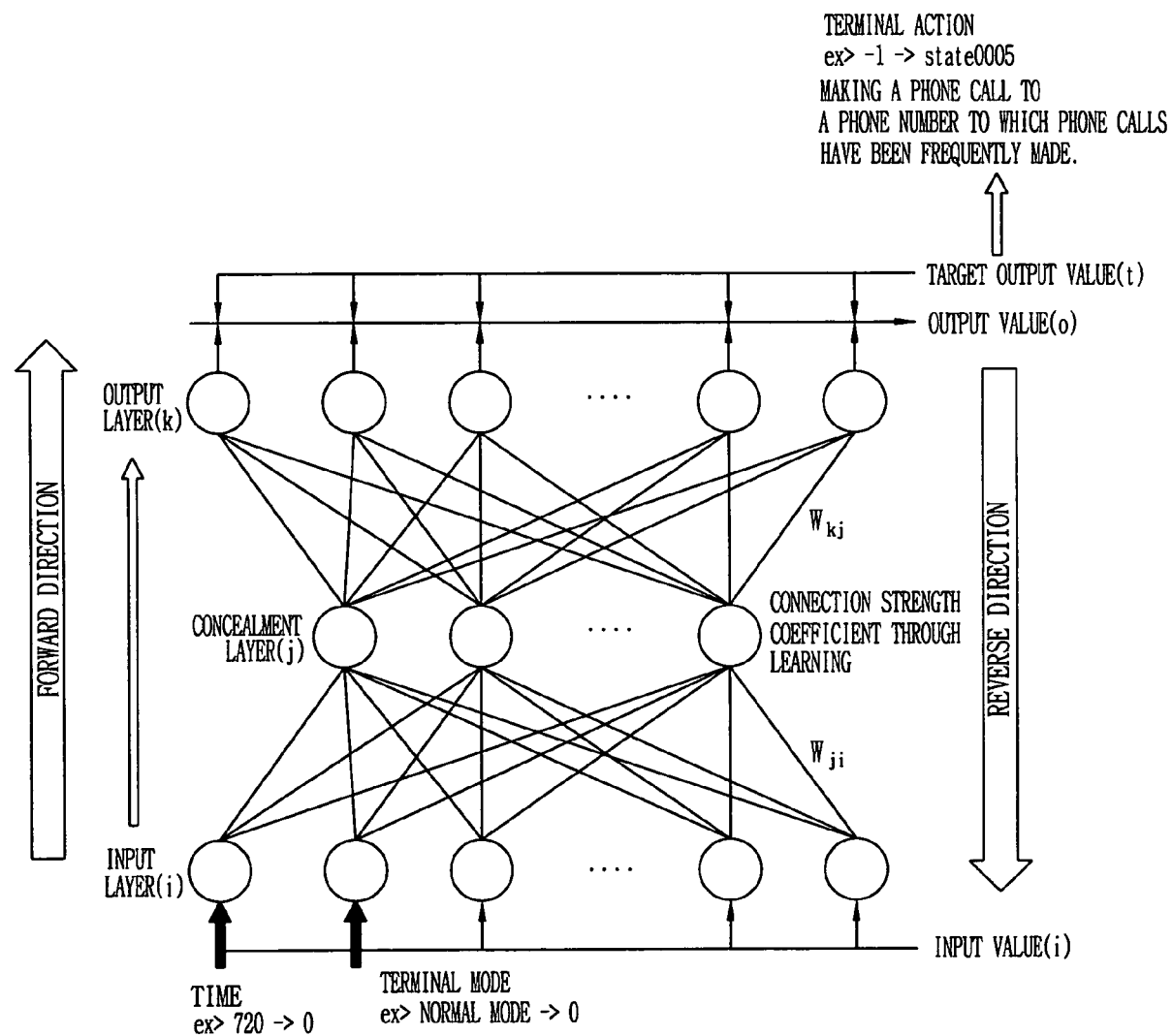
FIG. 3 illustrates learning of the MOBP learning algorithm in accordance with an example embodiment of the present invention.

FIG. 3 illustrates learning of the MOBP learning algorithm in accordance with an example embodiment of the present invention. Other embodiments are also within the scope of the present invention.

Learning may be made from the input layer to the output layer (i.e., in the forward direction) and the coefficient (Wk) of the line between layers of every MOBP may be determined from the output layer to the input layer (i.e., in the reverse direction) according to a difference between the target output value (t) and the output value (o), thereby updating the connection strength coefficient.

As shown in FIG. 3, in case that an action of the terminal is defined by a unit of a minute on the basis of a day and the time is standardized, if the user makes a phone call to a certain phone number at noon, since noon (12 o'clock) is 720 minutes, then it may be standardized to '0' and a user mode may be standardized to '0' in the normal mode.

Accordingly, '0', the input value 1 standardized at the time, and '0', the standardized input value 2 of the user mode, may be input to the input layer. After the input values are calculated together with the connection strength coefficient, '−1', a standardized output value may be output to the output layer and a message for checking whether to make a phone call to a phone number to which the user frequently makes a phone call, which corresponds to 'state0005' is output, all the processes of which are learned.

Thus, when the user opens the folder at 12 o'clock the next day, the terminal may calculate an output value by using the previously learned connection strength coefficient (Wk). If a function for obtaining an output value is y=f(x), 'x' is a standardized time and an input value of the terminal mode Wk is an internal parameter of the function f(x), and 'y' is an output value (i.e., an action) of the terminal. The input value may obtain an output value by calculating the value together with the connection strength (Wk).

After the action of the terminal is determined according to the output value, the terminal may change to the corresponding operation state (i.e., the call state). Then, a message for checking whether to make a phone call to a phone number to which the user has frequently used may be output, and if the user make a positive response to the message, a call connection may be automatically made.

Figure 4:
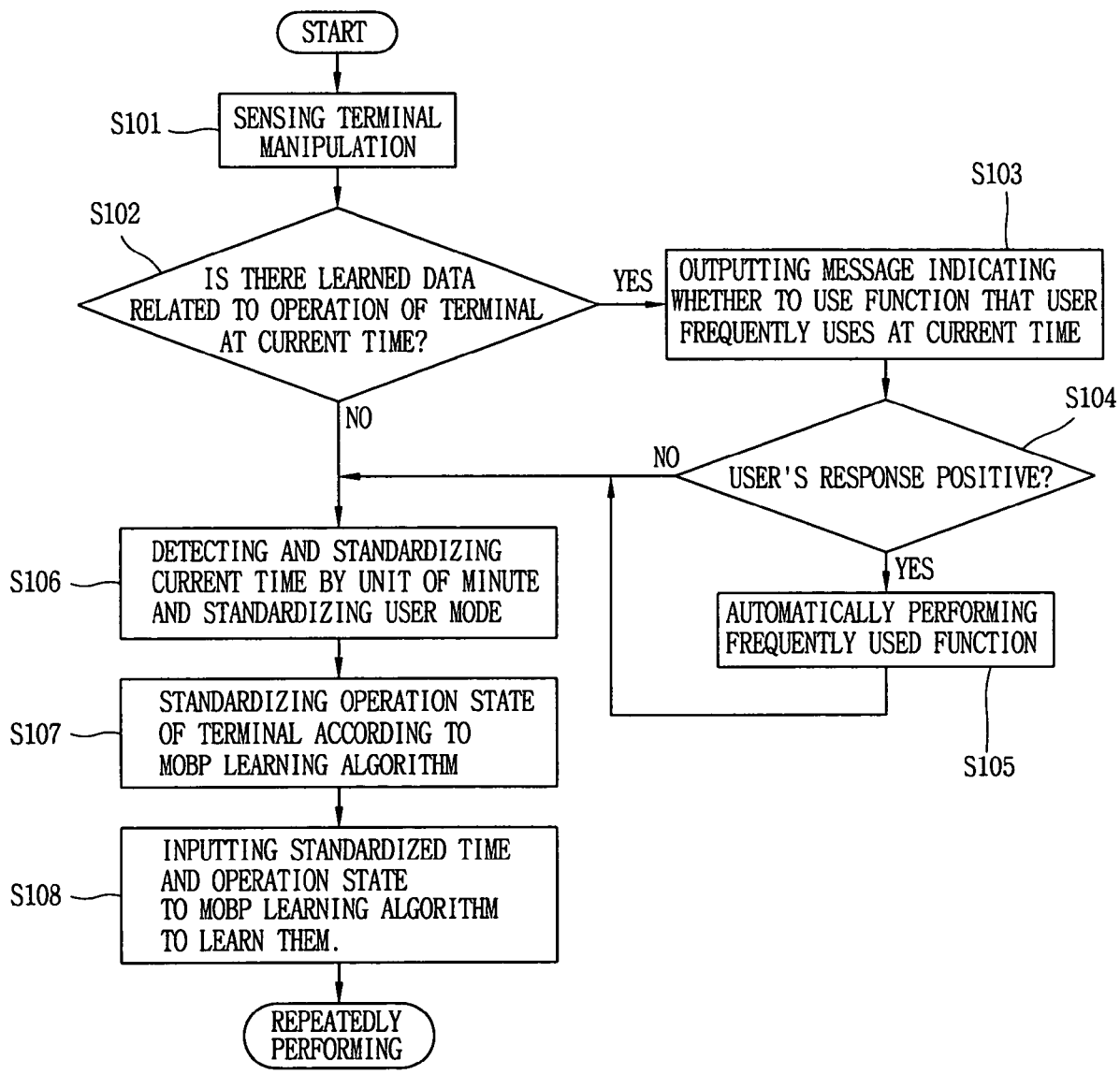
FIG. 4 is a flow chart of a method for learning user's terminal use habits and controlling a terminal in accordance with an example embodiment of the present invention.

FIG. 4 is a flow chart of a method for learning user's terminal use habits and controlling a terminal in accordance with an example embodiment of the present invention. Other operations, orders of operation and embodiments are also within the scope of the present invention.

In embodiments of the present invention, a time and a user mode standardized by the unit of a minute and an action of the terminal standardized to a value of −1 to 1 may be input by using the MOBP. When the terminal is in a standby state, the user may open the folder for manipulation of the terminal (operation S101). The terminal may determine whether there is previously learned data related to the terminal operation (operation S102).

If there is learned data in operation S102, a message asking whether a function frequently used at a current time is to be used may be output (or displayed) according to the learned content (operation S103). It may then be determined whether a user's response to the message is positive or negative according to the user's selection (operation S104). If the user makes a positive response in operation S104, an operation state may be changed to automatically perform the user's frequently used function (operation S105). That is, a phone call may be made to an arbitrary user or an SMS may be transmitted.

If, however, the user makes a negative response (operation S104) or if there is no previous learned data (operation S104) for the current time, learning may be performed on the operation state being currently made (operations S106~S108). In case of using the learned function, the learning functions may be continuously learned.

For the learning, the terminal may first detect a time and standardize the time as a value between −1 and 1 by the unit of a certain time and also standardize the user mode as a value between −1 and 1. In addition, in order to input an action of the terminal to the MOBP learning algorithm, the action may be standardized to a value −1 to 1.

The operational state of the terminal according to the standardized time and user mode may be input to the MOBP learning algorithm and the terminal may learn to update the connection strength. Accordingly, whenever the user manipulates the terminal, the terminal may continuously learn the manipulation content and the connection strength coefficient between layers may be updated so as to fit the user's habit of using the terminal.

Operation of the scheduling apparatus of a mobile communication terminal shown in FIG. 1 will now be further described. The terminal may sense user's manipulation in a standby state. Then, the CPU 10 may receive a time value from the RTC 41 and user mode information from the memory 30 on a real time basis. The time value and the user mode information may be standardized and it may be determined whether there is learned data related to a terminal action at a current time in the memory 30.

If learned data is stored in the memory 30, the CPU 10 may transfer the standardized time value and the user mode information to the co-processor 20 through an interrupt communication. The co-processor 20 may calculate an output value according to the MOBP learning algorithm together with the previously learned connection strength, and send the calculation output value to the CPU 10.

The CPU 10 may control the peripheral device 40 according to the output value. That is, the CPU 10 may output a message to the LCD 42 indicating whether to perform an operation of the terminal according to the output value.

A response to the message may be input through a key pad (not shown), and if the user's response is positive, the operational state may be changed to automatically perform a function that the user frequently uses. More specifically, a phone call can be automatically made to an arbitrary user or an SMS can be transmitted. If, however, the user makes a negative response to the question or there is no previously learned data for the current time, a current action of the terminal, a time value, and a standardized value of the user mode may be stored in the memory 30 for learning purposes.

Thereafter, the CPU 10 may send the data stored in the memory 30 to the co-processor 20 through the interrupt communication while the user charges a battery or at night, for example, when the user does not use the terminal. The co-processor 20 may calculate the connection strength (Wk) according to the MOBP learning algorithm and store the calculated value in the memory 30 so that an operational state of the terminal can be predicted from the next inputted values.

The scheduling apparatus and method of a mobile communication terminal according to embodiments of the present invention may have many advantages. For example, the mobile terminal may be given intelligence for predicting an operation of a user to automatically perform an operation of the terminal and the MOBP learning algorithm (rather than a statistical method requiring a large amount of data) may be used to obtain an accurate output value with a small amount of data. In addition, through learning, the more data used, then the more accurate is the terminal. This may result in that since the terminal learns the habit of the user, it may become suitable for the user more and more as the user increasingly uses the terminal. Thus, the user may simply use a desired function of the terminal.

Additionally, various operations as described above may occur when the terminal is being used less frequently, such as a night or when the terminal is being charged. This will allow the learning algorithm to better and more fully utilize the processor's capabilities.

The foregoing embodiments and advantages are merely exemplary and are not to be construed as limiting embodiments of the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A mobile communication terminal comprising:
a Real Time Clock (RTC) for providing a time;
a memory for storing user mode information;
a first processor for standardizing a time value from the RTC, the user mode information and an action of the terminal; and
a second processor for calculating standardized data according to a learning algorithm to adapt to the user's habit of using the terminal, the first processor outputting information to the second processor and controlling a peripheral device of the mobile communication device based on a calculated value of the second processor, wherein the RTC, the memory, the first processor and the second processor are provided in the mobile communication terminal,
wherein the learning algorithm comprises a Momentum Back-Propagation (MOBP) learning algorithm;
wherein when there is no learned data stored in the memory, the first processor standardizes a current time value, the user mode information and the terminal action, and the second processor calculates a connection strength based on the learning algorithm, and wherein a terminal action is performed by the mobile communication terminal based on the connection strength calculated by the second processor.

2. The terminal of claim 1, wherein the first processor standardizes each of the time value, the user mode information and the terminal action to a value between −1 and 1.

3. The terminal of claim 1, wherein the time value, the user mode information and the terminal action, which have been standardized by the first processor, are stored and an output value calculated by the second processor is additionally stored.

4. The terminal of claim 1, wherein the first processor and the second processor perform an interrupt communication with each other.

5. The terminal of claim 1, wherein the second processor comprises a Digital Signal Processor (DSP).

6. A scheduling method of a mobile communication terminal, the method comprising:
determining whether there is learned data stored in a memory of the mobile communication terminal;
standardizing a current time value provided from a Real Time Clock (RTC) of the mobile communication terminal and standardizing user mode information stored in the memory;
receiving the standardized current time value and the standardized user mode information at the mobile communication terminal and calculating an output value according to a learning algorithm, wherein the learning algorithm comprises a Momentum Back-Propagation (MOBP) algorithm; and
outputting a message of the mobile communication terminal relating to whether to perform a terminal action of a current time based on the calculated output value,
wherein when there is no learned data stored in the memory, the standardizing the current time value and the user mode information and the calculating the output value includes calculating a connection strength coefficient according to the learning algorithm, and wherein a terminal action is performed by the mobile communication terminal based on the calculated connection strength coefficient.

7. The method of claim 6, further comprising providing a response to the message.

8. The method of claim 7, wherein when the response to the message is positive, then the action of the terminal is automatically performed.

9. The method of claim 7, wherein when the terminal action is performed according to a positive response to the message, then the current time value, the user mode information and the terminal action are standardized and a connection strength coefficient is calculated according to the learning algorithm, and the calculated connection strength coefficient is stored in a memory.

10. The method of claim 7, wherein the terminal performs learning while the terminal is electrically charged or when the terminal is not used.

11. The method of claim 7, wherein when the response to the message is negative, then the current time value, the user mode information and the terminal action are standardized and a connection strength coefficient is calculated according to the learning algorithm.

12. The method of claim 6, wherein the current time value is converted into a unit of a minute or an hour and is standardized to a value between −1 and 1.

13. The method of claim 6, wherein the user mode information is standardized to a value between −1 and 1 according to a user's profile.

14. The method of claim 6, wherein the terminal action includes having at least one member of a group of a call state, a Short Message Service (SMS) state, an E-mail state, a WAP browser state, a data or fax call state, a multimedia state, an organizer state or a game state, which are standardized to a value of −1 to 1.

15. The method of claim 14, wherein each operational state of the terminal includes N number of supplementary information each having an index number.

16. The method of claim 15, wherein each operational state of the terminal is standardized to a value of −1 to 1 according to an order of the index number.

17. A scheduling method of a mobile communication terminal that learns a user's habit of using the terminal, the method comprising:
determining whether there is learned data for a current time;
calculating data according to a learning algorithm, and outputting a message of the mobile communication terminal indicating whether to use a function that a user has frequently used at the current time;

performing a function or changing the function to the terminal user habit learning state according to the user's response to the message; and learning information according to the learning algorithm when there is learned data related to the function that has been frequently used at the current time, wherein the learning algorithm comprises a Momentum Back-Propagation (MOBP) learning algorithm;

wherein when the mobile communication terminal determines there is no learned data stored in the memory, the learning includes standardizing a current time value and a user mode information and calculating a connection strength coefficient according to the learning algorithm, and wherein a terminal action is performed by the mobile communication terminal based on the calculated connection strength.

18. The method of claim 17, further comprising scheduling the terminal according to the learned data.

19. The method of claim 17, wherein learning user's habit of using the terminal comprises:

standardizing a current time and a mode of the terminal by a certain unit;

standardizing a current operational state of the terminal to be inputted to the algorithm;

updating a connection strength coefficient so that the standardized time and the standardized terminal mode can be inputted and a current operation of the terminal can be outputted; and repeatedly learning the inputting the standardized current time, the standardized terminal mode and the function.

20. The method of claim 19, wherein the current time is converted by the unit of a minute or an hour and is standardized to a value of −1 to 1.

21. The method of claim 19, wherein the mode of the terminal is standardized to a value between −1 and 1.

22. The method of claim 19, wherein the operational state of the terminal is obtained by standardizing operations of a user such as one member of a group of a call state, a Short Message Service (SMS) state, an E-mail state, a WAP browser state, a data or fax call state, a multimedia state, an organizer state or a game state.

23. The method of claim 22, wherein each operational state of the terminal includes N number of supplementary information.

24. The method of claim 23, wherein the N number of operational states of the terminal is standardized to a value of −1 to 1 according to an index number.

25. The method of claim 17, wherein when the user's response to the message is positive, then a function is performed and learning is simultaneously performed.

26. The method of claim 17, wherein when the user's response to the message is negative, then learning is performed on the currently performed operational state.

27. The method of claim 17, wherein the terminal performs learning while the terminal is electrically charging or when the terminal is not used.

28. The terminal of claim 1, wherein the second processor calculates the connection strength coefficient based on the learning algorithm and a previous connection strength coefficient.

* * * * *